July 19, 1966  E. B. ELFRINK  3,261,400

SELECTIVE PLUGGING METHOD

Filed May 14, 1963  2 Sheets-Sheet 1

ELLIOTT B. ELFRINK  INVENTOR.

BY *Emil J. Bednar*

ATTORNEY

July 19, 1966  E. B. ELFRINK  3,261,400
SELECTIVE PLUGGING METHOD

Filed May 14, 1963  2 Sheets-Sheet 2

ELLIOTT B. ELFRINK INVENTOR.

BY *Emil J. Bednar*
ATTORNEY

United States Patent Office 3,261,400
Patented July 19, 1966

3,261,400
SELECTIVE PLUGGING METHOD
Elliott B. Elfrink, Dallas, Tex., assignor to Mobil Oil Corporation, a corporation of New York
Filed May 14, 1963, Ser. No. 280,377
19 Claims. (Cl. 166—30)

This invention relates to a method for reducing the permeability of a subterranean formation. More particularly, it relates to the establishment of a barrier of reduced permeability at a desired location in a permeable subterranean formation.

In general, the efficient recovery of petroleum requires that the containing formations be permeable to at least a certain extent. The greater the permeability, the freer will be the flow of petroleum from the formations. The petroleum-containing formations, which collectively may be denoted as a reservoir usually are of heterogeneous permeability. For these reasons, permeability stratification exists in many reservoirs subjected to petroleum recovery procedures.

Permeability stratification creates many problems. For example, in secondary recovery procedures where the petroleum is produced from the reservoir in front of a displacing medium, an early breakthrough of the displacing medium can occur through the formation having the greater permeability. This results in lower efficiencies in the production and recovery of petroleum from the remaining formations by these secondary recovery procedures. These secondary recovery procedures may be, for example, the immiscible displacements of petroleum by water and low pressure lean gas, and the miscible displacements of petroleum by high pressure gas, enriched gas, and liquefied petroleum gases. The secondary recovery procedures may also include in situ combustion and other thermal recovery operations.

The problems created by permeability stratification can be diminished or avoided by reducing the permeability of the more permeable formation. One means for obtaining this result is to establish a barrier of reduced permeability in the more permeable formation. The barrier can be established by placing a plugging material in the pore spaces or interstices of the formation. However, this barrier should be established in the formation at a particular location where it is deemed to be most effective. For example, a barrier of reduced permeability in the formation located midway between the injection wells and the production wells may be desired.

At least one procedure has been proposed for placing this barrier at a given location in a more permeable formation to reduce the effects of permeability stratification. For various reasons, to my knowledge, no successful use has been made of this procedure or of any other for placing a barrier of reduced permeability at a given location in a formation.

It is therefore an object of this invention to provide a method for reducing the permeability of a permeable formation. Another object is to establish a barrier of reduced permeability at any desired location in a permeable formation. Another object is to use a physical property of the more permeable formation as the control function for establishing a barrier of reduced permeability at a given location in the formation. Another object is to selectively establish a barrier of reduced permeability at a given location in a formation.

These and further objects will become apparent when read in conjunction with the following detailed description, the appended claims, and the attached drawings of certain preferred and illustrative embodiments of the invention, wherein:

In accordance with this invention, there is provided a method for establishing a barrier of reduced permeability at a given location in a permeable formation. The control for establishing the barrier is proportional to the pore volume of the formation. More particularly, the method comprises steps of passing, in immediate succession, an agent convertible to a plugging material, a miscible buffer fluid, and an immiscible activating fluid through the formation to adjacent the desired location of the barrier. The agent is converted to a plugging material by reaction with the activating fluid upon contact between these substances. The miscible buffer fluid, in a given amount, is interposed between the agent and the activating fluid to prevent premature reaction between the agent and the activating fluid. The miscible buffer fluid distributes a certain residual quantity in the pore spaces of the permeable formation as it moves therethrough before the advancing immiscible activating fluid. Thus, a certain amount of a miscible buffer fluid can traverse a formation for a given distance ahead of the advancing activating fluid before dissipating to permit reaction between the agent convertible to a plugging material and the activating fluid. Furthermore, the amount of buffer fluid required to traverse a given distance before being dissipated in the formation's interstices is determinable since the pore volume of the residue of the buffer fluid is proportional to the pore volume of the formation.

Figure 1:
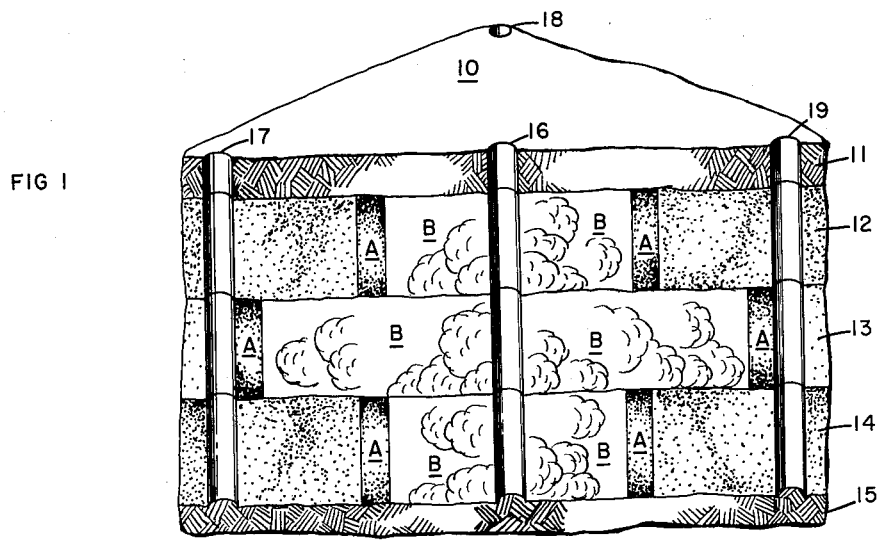
FIGURE 1 is a sectional perspective view of a reservoir having permeability stratification while subjected to a secondary petroleum recovery procedure.

Illustrative problems arising from permeability stratification in a reservoir will now be described. Referring to the drawings, there is shown in FIGURE 1 a reservoir 10 comprising an impermeable overburden 11, petroleum-containing formations 12, 13, and 14, and an impermeable formation 15. For purposes of this description, the formation 13 will be assumed to be more permeable than formations 12 and 14.

The reservoir 10 is, as shown in FIGURE 1, provided with a plurality of wells 16, 17, 18 and 19, disposed in an equidistance well spacing pattern. Other well patterns may be used if desired. The wells 16, 17, 18 and 19 may be provided with the usual apparatus (not shown) for secondary recovery procedures. For example, the well 16 may be adapted for the injection of a displacement fluid into the formations 12, 13 and 14. The wells 17, 18 and 19 may be adapted for the recovery of the petroleum produced from the reservoir 10.

A particular secondary recovery procedure will be described to illustrate the problems encountered when the reservoir 10 has permeability stratification. However, other petroleum recovery procedures are equally pertinent.

The secondary recovery procedure is a miscible displacement method. This method involves injecting via the well 16 a slug A of liquid petroleum gases (hereinafter denoted as LPG) into the formations 12, 13 and 14. The LPG slug A is followed with a natural gas drive B. This method will result in the efficient recovery of substantial amounts of the petroleum and also of the LPG slug A from the wells 17, 18 and 19 only when the displacement fluids move at uniform rates through the formations 12, 13 and 14. In the present example, the LPG slug A and the following natural gas drive B move at a greater rate in the more permeable formation 13 than in the lesser permeable formations 12 and 14. As a result, an early breakthrough of the displacement fluids occurs from the formation 13 into the wells 17, 18 and 19. This breakthrough leaves large amounts of petroleum and also the LPG slug A remaining in the formations 12 and 14 some distance from the wells 17, 18 and 19. Further amounts of petroleum cannot be efficiently recovered because of increased amounts of the miscible displacement fluids required to produce a certain amount of petroleum. Obviously, a barrier of reduced permeability established in the formation 13 at a given location, for example, midway between the well 16 and the wells 17, 18 and 19, will reduce the flow of the displacement fluids in formation 13. As a result, further injection of the natural gas drive B will more efficiently produce the remaining petroleum by the LPG slug A in the formations 12 and 14.

An illustrative embodiment of the invention will now be described with reference to FIGURES 2 and 3. As a first step, a fluid agent 23 convertible to a plugging material is passed from one of the wells, for example, the well 16 through a given distance in the formation 13 to the desired location which may be midway to the other of the wells, for example to the wells 17, 18 and 19. Any suitable means for independent fluid communication may be used for introducing the agent 23 into only the formation 13. For example, the well 16 may be provided with a fluid conduit 20 and packer means 21 and 22 to isolate fluidly the more permeable formation 13 from the lesser permeable formations 12 and 14. Other means to introduce the agent 23 into the formation 13 independently of the formations 12 and 14 may be used, if desired.

Generally, the agent 23 is introduced as a slug via the conduit 20 into the formation 13 so that it can be passed therein to the desired location. The amount of the slug of the agent 23 is not critical. However, the reduction in permeability produced by the barrier is proportional to the amount of the agent 23 introduced into the formation 13. The barrier need not reduce the permeability of the formation 13 to zero. For the purposes of this invention, any reduction in permeability provided by the barrier in the formation 13 is to be considered satisfactory in that it reduces permeablity stratification.

Usually, the agent 23 need not be used in an amount greater than .01 percent of the pore volume of the formation 13 disposed between the wells 16 to 19. However, greater amounts of the agent 23 can be used, if desired. In most situations, the agent 23 will be used in solution with a nonreactive solvent. This solution will be hereinafter referred to as the "carrier fluid." The carrier fluid may be used in most instances in an amount of less than 5 percent of the pore volume of the formation 13 disposed between the wells 16 to 19. The agent 23 may be present in an amount from one-third to one-fiftieth of the total volume of the carrier fluid for satisfactory results.

Various substances convertible to a formation plugging material can be used as the agent 23 in the method of this invention. A number of substances convertible to a formation plugging material for use as the agent 23 are hereinafter disclosed. However, the method of this invention is not limited to the listed substances but can be used with any substance capable of providing the desired in situ conversion from a fluid to a nonflowing plugging material by reaction with an activating fluid. Examples of these substances convertible by water are the organic titanates, titanium, tetrachloride, silicon tetrachloride, silicon tetrafluoride, stannic chloride, and aluminum bromide. Other substances not convertible by water may also be used. For example, sodium silicate solutions can be converted to a plugging material by carbon dioxide, amides, urea, ammonium and sodium bicarbonates, and acid sulfates.

The term "organic titanates" is herein employed to denote the organic esters of titanium. More particularly, it denotes the tetra ortho esters of titanium. Various organic esters of titanium having any of several organic radicals may be employed. Each of the organic radicals may contain from 1 to 17 or more carbon atoms. For example, the tetraalkyl, tetraaryl, and tetraacyl ortho esters of titanium may be employed. Further, the ortho esters of titanium may carry a mixture of these alkyl, aryl, and acyl organic radicals. Typical alkyl esters of titanium that may be employed include tetraisopropyl titanate, tetra n-butyl titanate, tetra 2-ethylhexyl titanate, and tetrastearyl itanate. An example of one typical aryl ester of titanium is tetraphenyl titanate. Other suitable titanium esters include hydroxytitanium stearate, isopropoxytitanium stearate, hydroxytitanium oleate, isopropoxytitanium oleate, hydroxytitanium soy acylate, isopropoxytitanium soy acylate, hydroxytitanium linseed acylate, isopropoxytitanium linseed acylate, hydroxytitanium castor acylate, hydroxytitanium tall oil acylate, isopropoxytitanium tall oil acylate, hydroxytitanium cocoanut acylate, and isopropoxytitanium cocoanut acylate. Where the acyl esters are employed, a preliminary or subsequent step of introducing a basic compound into the formation to be treated is required. The basic compound may be a caustic such as sodium hydroxide or it may be ammonium hydroxide.

Generally, the organic titanates are liquids. However, the organic titanates having high molecular weight radicals, such as the stearyl radical, may be solid at about 60° F. For this reason and to facilitate convenient handling, a solvent is mixed with the latter materials to provide the carrier fluid. However, the use of a solvent with all organic titanates to provide the carrier fluid is desirable. The use of solvents with the organic titanates provides an increase in their mobility in the formation 13. Various solvents may be used with these organic titanates. For example, alcohols such as ethanol, isopropanol, and n-butanol; halohydrocarbons such as trichloroethylene and carbon tetrachloride and hydrocarbons such as hexane, n-heptane, benzene, and diesel oil may be used, if desired. The organic titanates containing the greater numbers of carbon atoms, such as those containing about 17 carbon atoms per organic radical, are much less soluble in the solvents than are the organic titanates having a smaller number of carbon atoms. However, all are adequately soluble for purposes of forming the carrier fluid.

The organic titanates hydrolyze rapidly with water whatever its source. Thus, the organic titanates are convertible to a plugging material by a reaction with an activating fluid containing water in formation 13. The plugging material is believed to be the amorphous, gelatinous, and tenacious titanium dioxide. It is preferable from the standpoint of economy to use water as the activating fluid for the organic titanates. However, an activating fluid containing water can be used if desired.

Other substances hydrolyzed to a plugging material by an activating fluid containing water may be used as agent 23, if desired. The substances titanium tetrachloride, silicon tetrachloride, silicon tetrafluoride, stannic chloride, and aluminum bromide are of this nature. Some of these substances are fluids at reservoir conditions and thus do not require the use of a solvent to form a carrier fluid for their placement. For example, silicon tetrafluoride can be used in its natural form since it is gaseous at reservoir conditions. However, for convenience in application, the use of a solvent is desirable with these substances. Various solvents may be used. For example, the solvent may be a hydrocarbon.

The principal requirements for a solvent to form the carrier fluid with the selected agent 23 are miscibility with the agent 23 and, to a lesser degree, adequate mobility in the formation 13. Where the solvent for the agent 23 can be a hydrocarbon, any hydrocarbon can be usually used when selected from hydrocarbons ranging from natural gas to diesel oil and even heavier hydrocarbons having adequate mobility in formation 13. However, other types of solvents may also be used.

Figure 2:
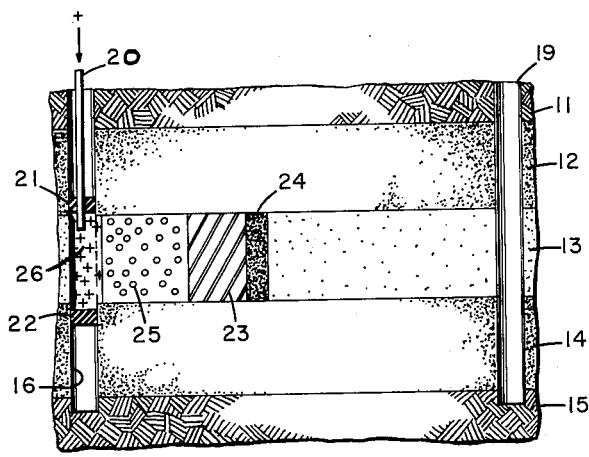
FIGURE 2 is a partial elevational view of the reservoir of FIGURE 1 after completion of certain initial steps for establishing a barrier of reduced permeability.
Figure 3:
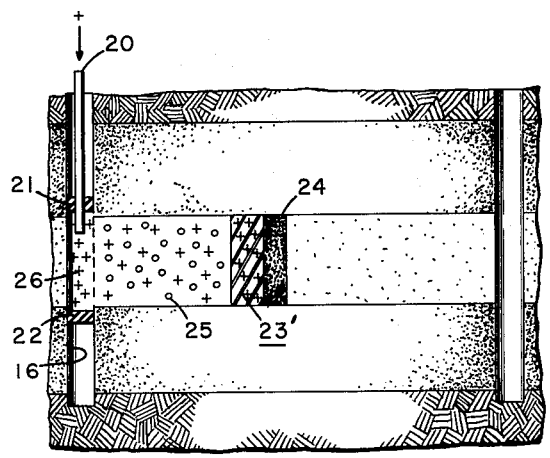
FIGURE 3 is a view like FIGURE 2 illustrating the barrier of reduced permeability established at the desired location in the more permeable formation of the reservoir.

In most cases, it will be desirable to remove any reactant, as shown in FIGURE 2, capable of converting the agent 23, such as water, from the path of the agent 23 to prevent a premature establishing of the barrier of reduced permeability. The reactants can be removed by preceding the agent 23, as it is passed through the formation 13, with a nonreactive prewash solvent 24 capable of dissolving or displacing the reactant from the formation 13. The prewash solvent 24 should be miscible with the agent 23 to prevent extensive intermixing. Examples of suitable solvents that can be used for displacing reactants, such as water, are isopropanol, ethanol, and anhydrous ammonia.

It may be found in certain cases that an immiscible solvent may be used for removing water or other reactant from the formation 13. For example, the solvent may be a hydrocarbon. The hydrocarbon may be selected from those having characteristics similar to the hydrocarbons from natural gas to diesel oil and heavier fluid hydrocarbons.

Solvents for displacing or dissolving other reactants capable of converting the agent 23 to a plugging material may be also used as circumstances indicate.

The amount of the prewash solvent 24 need not be great to provide satisfactory results. For example, the prewash solvent 24 in a sufficient amount to provide a band before the agent 23, or carrier fluid, of a thickness of a few inches to about a foot usually will produce the desired function. However, larger amounts of prewash solvent 24 may be used, if desired. The amount of the prewash solvent 24 will be substantially the pore volume of such band in the formation 13 before the agent 23.

As the next step, a given amount of a buffer fluid 25 is introduced via conduit 20 into the formation 13 immediately following the agent 23. The buffer fluid 25 must be miscible with the agent 23, or with the carrier fluid containing the agent 23 as the case may be. Thus, the buffer fluid 25 serves as a miscible displacement fluid to move the agent 23 into the formation 13 without substantial intermixing. These substances must also be nonreactive with the agent 23, or the carrier fluid containing same. Various substances may be used as the buffer fluid 25. The buffer fluid 25 may be selected from the group previously described as miscible solvents for dissolving the agent 23 to form the carrier fluid. Preferably, the buffer fluid 25 is a hydrocarbon. The hydrocarbon may be of hydrocarbons having characteristics between methane and the heavy liquid hydrocarbons like diesel oil. The hydrocarbon may be used singly or in various combinations with other hydrocarbons. Other fluids miscible with the agent 23, or the carrier fluid containing the agent 23, may be used, if desired.

A physical property of the formation 13 is the definite fluid-containing capacity provided by the existing pore spaces or interstices. The fluid capacity is generally denoted as the pore volume of the formation 13. I have found that the miscible buffer fluid 25 leaves a certain fluid residue in the pore spaces or interstices of the formation 13 as it moves before an advancing immiscible fluid. Further, this certain fluid residue is proportional to the pore volume of the formation 13. Thus, the amount of the miscible buffer fluid 25 required to traverse a given distance before being dissipated into the pore spaces or interstices of the formation 13 can be determined. As a result, the amount of the buffer fluid 25 controls the intermixing of an immiscible fluid for activating the agent 23 to form a plugging material at the desired barrier location.

It is in the manner thus described that the barrier of reduced permeability is formed by this invention at the desired location in formation 13. The pore volume of the formation 13 is usually known from earlier reservoir studies. The pore volume residue of the miscible buffer fluid 25 in the formation 13 may also be known. If unknown, it can usually be assumed to be between approximately 10 and 40 percent of the pore volume of the formation 13. Light hydrocarbons, such as propane, will leave about 20 percent pore volume residues in the formation 13 before an advancing immiscible fluid. Heavy hydrocarbons, such as diesel oil, will leave about 30 percent pore volume residues in the formation 13 before an advancing immiscible fluid. Where the placement of the barrier of reduced permeability is not critical, for example within 25 percent of the distance to a given location, the preceding criterion may be applied in order to estimate the pore volume residue of the miscible buffer fluid 25 in the area to be traversed by the agent 23 before reaching the desired location of the barrier. This residual volume is the amount of the buffer fluid 25 to be used in establishing the barrier of reduced permeability at approximately the desired location.

If desired, the exact pore volume residue of the buffer fluid 25 may be determined. The procedure for determining the exact pore volume residue of the buffer fluid 25 requires a sample of the formation 13. The sample usually will be a core. The core should be brought to the reservoir conditions which will be those existing when it is desired to practice the method of this invention.

Next, the agent 23 is passed into the core sample. If it is desired to use a prewash solvent 24 before the agent 23 in the formation 13, then the prewash solvent 24 also should be passed through the core at reservoir conditions ahead of the agent 23. Thus, the core is now at the same conditions as exist in the formation 13 immediately prior to the injection therein of the buffer fluid 25. As a next step, a known quantity of the buffer fluid 25 to be used in the method of the present invention is injected as a slug into the core. The known quantity should be sufficiently large that substantially all of the prewash solvent 24 and the agent 23 is recovered from the core. The immiscible fluid for activating the agent 23 is injected immediately after the slug of the buffer fluid 25. The immiscible fluid is used in an amount sufficient to establish a state of equilibrium in the core with respect to the buffer fluid 25. The buffer fluid 25 removed from the core by displacement with the immiscible fluid is measured. The amount of the buffer fluid 25 which remains in the core is the difference between the amount of the buffer fluid 25 injected into the core and the amount displaced therefrom by the immiscible fluid. The pore volume residue of the buffer fluid 25 in the core is the volume of the unrecovered buffer fluid 25 divided by the pore volume of the core through which the buffer fluid 25 was passed. By this means, the exact pore volume residue of the buffer fluid 25 desired to be used in the method of the present invention in the formation 13 can be determined. Thus, the amount of the buffer fluid 25 to be injected into the formation 13 is substantially equal to the pore volume residue of such substance in that part of the formation 13 situated between the injection well 16 and the location at which the barrier of reduced permeability is to reside in the formation 13.

The results of the heretofore-described steps are graphically displayed in FIGURE 2. The formation 13 is shown as being traversed by the prewash solvent 24, the agent 23, and the miscible solvent 25.

As another step, a quantity of an immiscible activating fluid 26 is introduced into the formation 13 immediately following the miscible buffer fluid 25. As previously discussed, the activating fluid 26 must be capable of reacting with the agent 23 in situ in the formation 13 to provide a nonflowing plugging material. Further, the activating fluid must be immiscible with the buffer fluid 25. The activating fluid 26 is preferably water where the agent 23 can be hydrolyzed to a plugging material. However, other substances can be used for the activating fluid 26. The activating fluid 26, for example water, is injected between packers 21 and 22 in well 16 via tubing 20 into the formation 13 as is shown in FIGURE 2. The activating fluid 26 is used in an amount at least sufficient to move the agent 23, or the carrier fluid containing same, to the desired location in the formation 13 where the barrier of reduced permeability is desired to be established. As best shown in FIGURE 3, the buffer fluid 25 disperses in that portion of the formation 13 which it traverses before the advancing immiscible activating fluid 26. Further the advancing activating fluid 26 continues to push the agent 23, or the carrier fluid containing the agent 23, and the prewash solvent 24 by means of the undispersed buffer fluid 25 before it in the formation 13. This advancing of the agent 23 continues until the buffer fluid 25 is completely dissipated in the interstices of the formation 13. At this condition the activating fluid 26 now intermixes and reacts with the agent 23, as shown in FIGURE 3. Thus, the barrier of reduced permeability designated by the numeral 23' is established at the desired location. The barrier of reduced permeability 23' comprises a plugging material formed by the reaction of the activating fluid 26, designated as crosses, and the agent 23, or the carrier fluid containing the agent 23, designated by the cross-hatched areas. The portion of the formation 13 situated between the barrier of reduced permeability 23' and the well 16 contains the remainder of the activating fluid 26 and the total amount of the buffer fluid 25. Thus, from the foregoing description, it will be obvious that the distance traversed by the agent 23, or the carrier fluid containing the agent 23 before being formed into the barrier 23' is a function of the pore volume of the formation 13.

Figure 4:
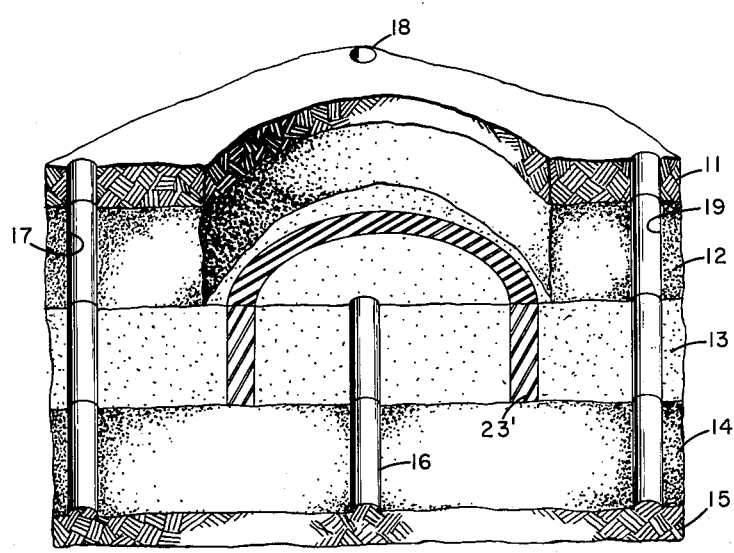
FIGURE 4 is a view like FIGURE 1 with a portion of the reservoir removed above the more permeable formation illustrating in detail the resultant barrier of reduced permeability in place.

Although the barrier 23' is shown as being substantially circular in FIGURE 4, in practical applications the barrier 23' will be other than circular because the usual reservoir is not truly isotropically permeable. However, the barrier 23' is continuous through the formation 13 about the well 16.

After the barrier 23' is established, the packers 21 and 22 and conduit 20 may be removed from the well 16. The injection of the natural gas drive B through well 16 into the formations 12, 13, and 14 is reinitiated. The LPG slug A will now move at substantially uniform rates in formations 12 and 14 producing the hydrocarbons which remained therein. The natural gas drive B cannot channel through the formation 13 as it did after the premature breakthrough of the LPG slug A and injected natural gas at the formation 13 in wells 17, 18 and 19 because of the barrier 23'. As a result, the injection of the natural gas drive B may be continued until all of the hydrocarbons are recovered from formations 12 and 14 along with substantially all of the LPG slug A.

The method of this invention has been described in connection with a miscible displacement procedure. However, the method of this invention can be used in connection with other types of petroleum recovery methods. It may also be used in the initial preparation of a barrier of reduced permeability in a formation for other purposes. The present invention is of great utility in establishing a barrier of reduced permeability at a particular location in any formation by using an inherent property of the formation in which the barrier is to be formed as the controlling function. This function permits the use of any agent convertible to a plugging material followed by any miscible barrier fluid, in a determinable amount, and moved into place in the formation by any immiscible activating fluid for converting the agent to a plugging material.

From the foregoing, it will be apparent that there has been herein provided a method for establishing a barrier of reduced permeability at a desired location in a permeable formation which satisfies the objects of the present invention. Various changes and adaptations may be made to the present method by a person skilled in the art without departing from the intent of the invention. It is intended that the foregoing description be considered as illustrative and descriptive of the present invention and that the only limitations are those recited in the appended claims.

What is claimed is:

1. A method for creating a barrier of reduced permeability in a formation comprising the steps of:
    (a) passing a fluid including an agent convertible by reaction substantially exclusively with a subsequently introduced activating fluid to a plugging material a given distance in a formation,
    (b) following said agent with a miscible fluid slug, said miscible fluid displacing said agent substantially in its entirety through the formation without converting said agent to a plugging material and
    (c) following said miscible fluid with an immiscible fluid for converting said agent to a plugging material upon contact, said miscible fluid slug being initially present in only such amount as to be substantially dissipated in the formation upon the agent traveling the given distance in the formation permitting the immiscible fluid to contact the agent to produce the plugging material thereby forming a barrier of reduced permeability in the formation.

2. The method of claim 1 wherein a miscible solvent for displacing substances capable of converting the agent precedes said agent the given distance in the formation.

3. The method of claim 1 wherein said miscible solvent is the same as the miscible fluid following the agent.

4. A method for creating a barrier of reduced permeability in a subterranean formation comprising the steps of:
    (a) passing a hydrocarbon fluid carrying an agent hydrolyzable by reaction substantially exclusively with a subsequently introduced activating fluid to a plugging material a given distance in a formation,
    (b) following said hydrocarbon fluid with a miscible hydrocarbon slug, said miscible hydrocarbon slug displacing said agent substantially in its entirety through the formation without converting said agent to a plugging material and
    (c) following said miscible hydrocarbon with an immiscible fluid containing water, said miscible hydrocarbon being initially present in only such amounts as to be substantially dissipated in the formation upon the hydrocarbon carrying the hydrolyzable agent traveling the given distance in the formation, and permitting the water in the immiscible fluid to contact and hydrolyze the agent to a plugging material thereby forming a barrier of reduced permeability in the formation.

5. The method of claim 4 wherein the agent is selected from the group consisting of organic titanates, titanium tetrachloride, silicon tetrachloride, silicon tetrafluoride, stannic choride, and aluminum bromide.

6. The method of claim 4 wherein the miscible hydrocarbon slug is initially present in an amount about between 10 and 40 percent of the pore volume of the formation traversed by the agent carrying hydrocarbon in passing the given distance.

7. The method of claim 4 wherein the amount of the agent carried by the hydrocarbon is between one-third to one-fiftieth of the total volume of such hydrocarbon.

8. A method for establishing in a subterranean formation a reduced permeability barrier spaced a given distance from a fluid injection location provided therein, comprising the steps of introducing into the formation via said location in immediate succession:
    (a) a slug of a fluid including an agent convertible to a plugging material by reaction in the formation substantially exclusively with a subsequently introduced activating fluid,
    (b) a slug of a buffer fluid, miscible with the agent, for displacing said agent substantially in its entirety through the formation, said buffer fluid being incapable of converting said agent to the plugging material, (c) an activating fluid, immiscible with the buffer fluid, for displacing said priorly introduced fluid through the formation until the agent traverses the given distance to the position of the prospective barrier and thereat converting the agent to a plugging material, and (d) the slug of buffer fluid being injected in the amount which, upon its immiscible displacement by the activating fluid, remains as the pore volume residue in the formation traversed by said fluids between the fluid injection location and the ultimate position of the reduced permeability barrier at a given distance from said location.

9. The method of claim 8 wherein a slug of a miscible solvent for displacing substances capable of converting said agent precedes said agent.

10. The method of claim 8 wherein the agent is silicon tetrafluoride, the buffer fluid is a hydrocarbon, and the activating fluid is water.

11. The method of claim 8 wherein the agent is sodium silicate and the activating fluid is selected from the group consisting of carbon dioxide, amides, urea, ammonium and sodium bicarbonates, and acid sulfates.

12. The method of claim 8 wherein the agent is selected from the group consisting of organic titanates, titanium tetrachloride, silicon tetrachloride, silicon tetrafluoride, stannic chloride, and aluminum bromide.

13. The method of claim 8 wherein the agent is present in an amount between one-third to one-fiftieth of the total slug volume of the fluid including said agent.

14. A method for establishing in a subterranean formation a reduced permeability barrier spaced a given distance from a fluid injection location provided therein, comprising the steps of introducing into the formation via said location in immediate succession:

(a) a slug of a fluid including an agent convertible to a plugging material by reaction in the formation substantially exclusively with a subsequently introduced activating fluid, said agent being in an amount of at least .01 percent of the pore volume of the formation containing the barrier of reduced permeability, (b) a slug of a buffer fluid, miscible with the agent, for displacing said agent substantially in its entirety through the formation, said buffer fluid being incapable of converting said agent to the plugging material, (c) an activating fluid, immiscible with the buffer fluid, for displacing said priorly introduced fluid through the formation until the agent traverses the given distance to the position of the prospective barrier and thereat converting the agent to a plugging material, and (d) the slug of buffer fluid being injected in the amount between 10 and 40 percent of the pore volume of the formation traversed by said fluids between the fluid injection location and the ultimate position of the reduced permeability barrier at a given distance from said location.

15. The method of claim 14 wherein a slug of a miscible solvent for displacing substances capable of converting said agent precedes said agent.

16. The method of claim 14 wherein the agent is silicon tetrafluoride, the buffer fluid is a hydrocarbon, and the activating fluid is water.

17. The method of claim 14 wherein the agent is sodium silicate and the activating fluid is selected from the group consisting of carbon dioxide, amides, urea, ammonium and sodium bicarbonates, and acid sulfates.

18. The method of claim 14 wherein the agent is selected from the group consisting of organic titanates, titanium tetrachloride, silicon tetrachloride, silicon tetrafluoride, stannic chloride, and aluminum bromide.

19. The method of claim 14 wherein the agent is present in an amount between one-third to one-fiftieth of the total slug volume of the fluid including said agent.

References Cited by the Examiner
UNITED STATES PATENTS 3,141,503   7/1964   Stein _____ 166—29

CHARLES E. O'CONNELL, *Primary Examiner.*

S. J. NOVOSAD, *Assistant Examiner.*